United States Patent
Mitsui et al.

(10) Patent No.: US 8,910,763 B2
(45) Date of Patent: Dec. 16, 2014

(54) HYDRAULIC CONTROL APPARATUS FOR VEHICULAR AUTOMATIC TRANSMISSION

(75) Inventors: Toshiaki Mitsui, Nagoya (JP); Yusuke Ohgata, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 45 days.

(21) Appl. No.: 13/879,902

(22) PCT Filed: Oct. 19, 2010

(86) PCT No.: PCT/JP2010/068354
§ 371 (c)(1),
(2), (4) Date: Jun. 28, 2013

(87) PCT Pub. No.: WO2012/053054
PCT Pub. Date: Apr. 26, 2012

(65) Prior Publication Data
US 2013/0284009 A1    Oct. 31, 2013

(51) Int. Cl.
*F16H 61/14* (2006.01)
*F15B 15/26* (2006.01)

(52) U.S. Cl.
CPC ............... *F15B 15/26* (2013.01); *F16H 61/14* (2013.01)
USPC ...................................... 192/3.29; 192/85.63

(58) Field of Classification Search
None
See application file for complete search history.

(56) References Cited

U.S. PATENT DOCUMENTS

| | | | |
|---|---|---|---|
| 6,306,061 B1 | 10/2001 | Inamura et al. | |
| 7,582,042 B2 * | 9/2009 | Sato et al. | 192/3.29 |
| 2002/0119864 A1 | 8/2002 | Harries | |
| 2003/0083169 A1 | 5/2003 | Iwata et al. | |
| 2006/0084545 A1 | 4/2006 | Morise et al. | |
| 2008/0051251 A1 | 2/2008 | Ogata et al. | |
| 2008/0064563 A1 | 3/2008 | Kobayashi et al. | |
| 2010/0181159 A1 * | 7/2010 | Shimizu et al. | 192/85.63 |

FOREIGN PATENT DOCUMENTS

| | | |
|---|---|---|
| DE | 102 05 619 A1 | 8/2002 |
| DE | 698 20 922 T2 | 6/2004 |
| DE | 10 2005 049 040 A1 | 4/2006 |
| DE | 10 2006 016 397 A1 | 10/2007 |

(Continued)

OTHER PUBLICATIONS

English whole machine translation of JP 2005-220997 A.

*Primary Examiner* — Rodney H Bonck
(74) *Attorney, Agent, or Firm* — Sughrue Mion, PLLC (57) ABSTRACT

Providing a hydraulic control apparatus for a vehicular automatic transmission, which makes it possible to design an oil pump with a reduced delivery capacity, thereby permitting an improvement of fuel economy of a vehicle.

The hydraulic control apparatus includes a supply passage connecting/disconnecting valve 114A which is operated, in synchronization with a switching operation of a lock-up relay valve 114, to apply a modulator pressure PM via an orifice 118 to a lock-up clutch 18, for placing the lock-up clutch 18 in the lock-up on state, and to inhibit the application of the modulator pressure PM to the lock-up clutch 18, for placing the lock-up clutch 18 in its lock-up off state. Accordingly, the modulator pressure PM via the orifice 118 is not applied to the lock-up clutch 18 when the lock-up clutch 18 is placed in the lock-up off state, so that a total amount of flow and consumption of the working oil is reduced, making it possible to design the oil pump 20 with a reduced delivery capacity, thereby permitting an improvement of fuel economy of the vehicle.

4 Claims, 7 Drawing Sheets

(56) References Cited

FOREIGN PATENT DOCUMENTS

| | | |
|---|---|---|
| DE | 10 2007 000 717 A1 | 3/2008 |
| JP | 60-138066 U | 9/1985 |
| JP | 1-131060 U | 9/1989 |
| JP | 3-204472 A | 9/1991 |
| JP | 2003-120797 A | 4/2003 |
| JP | 2005-220997 A | 8/2005 |
| JP | 2008-51318 A | 3/2008 |

* cited by examiner

HYDRAULIC CONTROL APPARATUS FOR VEHICULAR AUTOMATIC TRANSMISSION

CROSS REFERENCE TO RELATED APPLICATIONS

This application is a National Stage of International Application No. PCT/JP2010/068354 filed Oct. 19, 2010, the contents of which are incorporated herein by reference in their entirety.

TECHNICAL FIELD

The present invention relates to a hydraulic control apparatus for a vehicular automatic transmission, which is configured to switch a lock-up clutch between its lock-up on state and lock-up off state.

BACKGROUND ART

There is well known a hydraulic control apparatus for a vehicular automatic transmission, which is configured to switch a lock-up clutch provided in a fluid-operated power transmitting device, between its lock-up on (engaged) state and its lock-up off (released) state. Patent Document 1 discloses an example of such a hydraulic control apparatus for a vehicular transmission. The hydraulic control apparatus disclosed in Patent Document 1 is provided with a first pressure regulating valve of a pressure-relief type for regulating a pressure of a working oil delivered from an oil pump, to a first line pressure, and a second pressure regulating valve for regulating the first line pressure of the working oil discharged from the first pressure regulating valve, to a second line pressure, and is configured to switch the lock up clutch between its lock-up on and off states, with a lock-up switching valve configured to select respective passages of supply of the working oil of the second line pressure to the fluid-operated power transmitting device.

Figure 7:
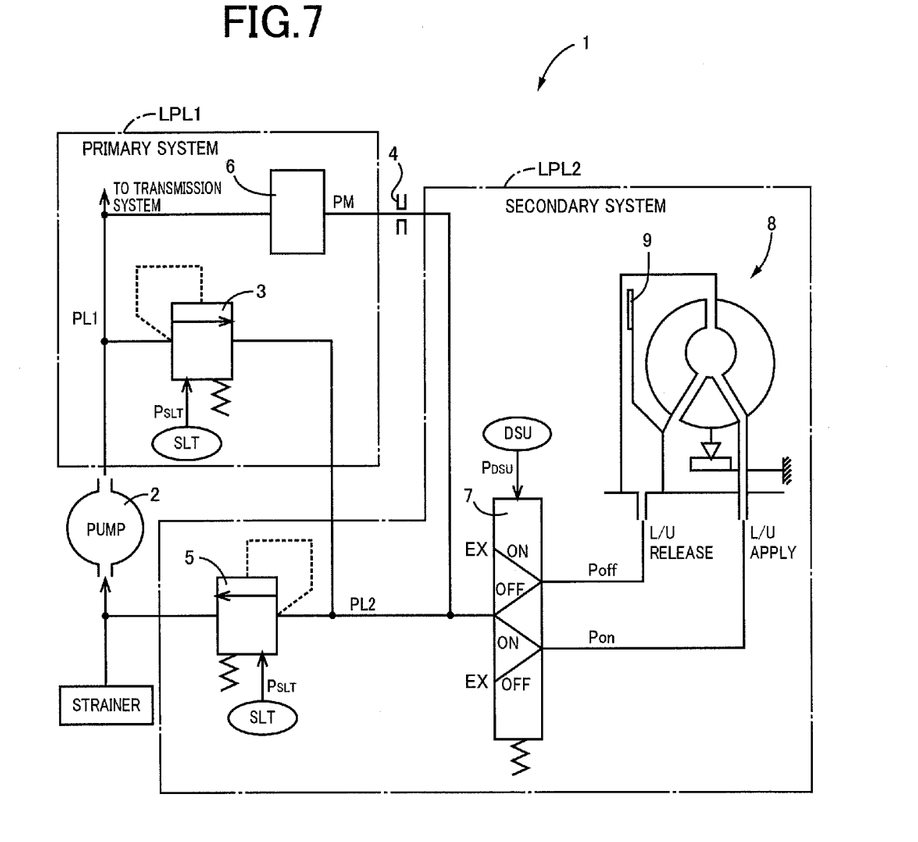
FIG. 7 is a view showing an example of a prior art hydraulic control circuit for switching the operating state of a lock-up clutch.

An increase of an amount of flow of the working oil of the first line pressure into a primary system may cause a decrease of an amount of the working oil discharged from the first pressure regulating valve, and an insufficient amount of flow of the working oil of the second line pressure into a secondary system, leading to a failure to hold the lock-up clutch in the lock-up on state. To avoid this problem, a hydraulic control circuit 1 as shown in FIG. 7 for example is proposed. In this hydraulic control circuit 1, the pressure of the working oil delivered from an oil pump 2 is regulated to a first line pressure PL1 by a first pressure regulating valve 3 of a pressure-relief type, and the working oil of the first line pressure PL1 flows into a primary system LPL1, while the pressure of the working oil discharged from the first pressure regulating valve 3 is regulated to a second line pressure PL2 by a second pressure regulating valve 5 of a pressure-relief type, and the working oil of the second line pressure PL2 flows into a secondary system LPL2. The hydraulic control circuit 1 is also arranged such that the working oil is kept supplied from the primary system LPL1 to the secondary system LPL2 via an orifice 4. Namely, the proposed hydraulic control circuit 1 is configured such that the first line pressure PL1 is regulated to a constant modulator pressure PM by a modulator valve 6, so that the working oil of the modulator pressure PM is supplied to a lock-up clutch 9 in a torque converter 8 via the orifice 4 and a lock-up switching valve 7, in addition to the working oil of the second line pressure PL2, for permitting the lock-up clutch 9 to be held in the lock-up on state.

PRIOR ART DOCUMENTS

Patent Documents

Patent Document 1: JP-A-2008-51318
Patent Document 2: JP-A-2005-220997

SUMMARY OF THE INVENTION

Object Achieved by the Invention

It is noted that when the lock-up clutch is placed in the lock-up off state with the lock-up switching valve being placed in its lock-up off state, it is possible to go so far as to say the working oil need not be supplied to the lock-up clutch. In the hydraulic control circuit configured as shown in FIG. 7 to permit the lock-up clutch in the lock-up on state, however, the working oil is supplied from the primary system to the secondary system even while the lock-up clutch is placed in the lock-up off state, resulting in an excessively large total amount of supply and consumption of the working oil. On the other hand, the delivery flow of the oil pump to deliver the working oil the pressure of which is regulated to the line pressures is determined by a hardware, that is, the size of the pump (delivery flow (delivery capacity) per revolution)×the operating speed of the pump. Accordingly, in view of a tendency that the amount of flow of the working oil is insufficient at a low operating speed of the pump, it is required to increase the size of the pump, for assuring a sufficient amount of flow of the working oil when the lock-up clutch is placed in the lock-up off state at a comparatively low operating speed of the pump, whereby the fuel economy may be deteriorated. In this respect, it is noted that the problem addressed above is not publicly known, and that there has been any proposal to reduce the amount of consumption of the working oil when the lock-up clutch is placed in the lock-up off state.

The present invention was made in view of the background art described above. It is therefore an object of the present invention to provide a hydraulic control apparatus for a vehicular automatic transmission, which makes it possible to design an oil pump with a reduced delivery capacity, thereby permitting an improvement of fuel economy of a vehicle.

Means for Achieving the Object

The object indicated above is achieved according to the present invention, which provides (a) a hydraulic control apparatus for a vehicular automatic transmission, which is provided with a first pressure regulating valve of a pressure-relief type for regulating a pressure of a working oil delivered from an oil pump, to a first line pressure, a second pressure regulating valve for regulating the above-described first line pressure of the working oil discharged from the above-described first pressure regulating valve, to a second line pressure, and a lock-up switching valve for switching a lock up clutch provided in a fluid-operated power transmitting device, between its lock-up on state and its lock-up off state, by selecting respective passages of supply of the working oil of the above-described second line pressure to the above-described fluid-operated power transmitting device, the hydraulic control apparatus being configured such that the working oil of a third hydraulic pressure obtained on the basis of the above-described first line pressure is supplied to the above-described lock-up clutch with said lock-up switching valve, in addition to the working oil of the above-described second line pressure, (b) the hydraulic control apparatus being characterized by comprising a supply passage connecting/disconnecting valve which is operated, in synchronization with a switching operation of said lock-up switching valve, to supply the working oil of said third hydraulic pressure to said lock-up clutch, when the lock-up clutch is placed in the lock-up on state, and to inhibit the supply of the working oil of said third hydraulic pressure to said lock-up clutch, when the lock-up clutch is placed in its lock-up off state.

Advantages of the Invention

The hydraulic control apparatus constructed as described above comprises the supply passage connecting/disconnecting valve which is operated, in synchronization with the switching operation of the lock-up switching valve, to supply the working oil of the third hydraulic pressure to the lock-up clutch, when the lock-up clutch is placed in the lock-up on state, and to inhibit the supply of working oil of the third hydraulic pressure to the lock-up clutch, when the lock-up clutch is placed in its lock-up off state. Accordingly, the working oil of the third hydraulic pressure is not supplied to the lock-up clutch when the lock-up clutch is placed in the lock-up off state, so that the total amount of flow and consumption of the working oil is reduced, making it possible to design the oil pump with a reduced delivery capacity, thereby permitting an improvement of the fuel economy of the vehicle.

In a preferred form of the present invention, the working oil of the above-described third hydraulic pressure is a working oil a pressure of which has regulated to a required lock-up pressure value predetermined to permit the above-described lock-up clutch to be held in the lock-up on state, and the hydraulic control apparatus further comprises a check valve which is disposed upstream of the above-described supply passage connecting/disconnecting valve and which permits a flow of the working oil of the above-described required lock-up pressure value in a downstream direction, only when the above-described second line pressure is lower than the above-described required lock-up pressure value. In this preferred form of the invention, the supply of the working oil of the third hydraulic pressure to the lock-up clutch is inhibited even when the lock-up clutch is brought to its lock-up on state, unless that the amount of the working oil discharged from the first pressure regulating valve is insufficient so that the second line pressure is lower than the required lock-up pressure. Accordingly, the required lock-up pressure is maintained, and the amount of flow and consumption of the working oil is further reduced, making it possible to design the oil pump with the reduced delivery capacity, thereby permitting a further improvement of the fuel economy of the vehicle.

In another preferred form of the invention, the working oil of the above-described third hydraulic pressure is a working oil a pressure of which has been regulated by a modulator valve to a predetermined constant pressure value on the basis of the above-described first line pressure and which has been discharged toward the above-described supply passage connecting/disconnecting valve via an orifice. In this preferred form of the invention, the working oil is adequately supplied via the orifice from the primary system using the working oil of the first line pressure, to the secondary system using the working oil of the second line pressure, to avoid an insufficient amount of flow of the working oil into the secondary system and a consequent failure to hold the lock-up clutch in the lock-up on state, that is, to permit the lock-up clutch in the lock-up on state.

In a further preferred form of the invention, the above-described supply passage connecting/disconnecting valve is formed as an integral part of the above-described lock-up switching valve. This preferred form of the invention has an advantage in terms of saving of required space and cost of manufacture of the supply passage connecting/disconnecting valve, and simplicity of a passage for application of a pilot pressure for the switching operation of the lock-up switching valve as compared to a case where a supply passage connecting/disconnecting valve and a lock-up switching valve are designed independently.

MODE FOR CARRYING OUT THE INVENTION

According to the present invention, the above-described vehicular automatic transmission is preferably selected from among: various kinds of automatic transmission of a planetary gear type having a plurality of gear positions (shift positions) which are selectively established by selective connection of rotary elements of a plurality of planetary gear sets with coupling devices, for instance; a so-called "belt-type" continuously variable transmission which has a power transmitting member in the form of a transmission belt connecting a pair of variable-diameter pulleys effective diameters of which are variable, to continuously change the speed ratio of the transmission; a so-called "traction-type" continuously variable transmission which has a pair of cones rotatable about a common axis, and a plurality of rollers which are pressed between the pair of cones and rotatable about an axis intersecting the above-indicated common axis such that an angle of intersection between the common axis and the axis of rotation of the rollers is variable to continuously change speed ratio of the transmission; and a so-called "parallel-type" automatic transmission which is provided with an electric motor or motors operatively connected to a drive shaft of an engine or an output shaft of the transmission, and which is installed on a hybrid vehicle. Further, the above-described vehicular automatic transmission is a power transmitting device which is provided with a fluid-operated power transmitting device equipped with a lock-up clutch, and which is configured to transmit a drive force generated by a vehicle drive power source, to drive wheels.

The above-indicated vehicle drive power source is preferably a commonly used internal combustion engine such as a gasoline engine and a diesel engine. In place of, or in addition to this engine, an electric motor or electric motors may be used as the vehicle drive power source.

In the description herein, an expression "to apply a hydraulic pressure" is interpreted to mean "to cause the hydraulic pressure to act" or "supply a working oil regulated to have the hydraulic pressure". Further, the above-described hydraulic control apparatus is a control apparatus which is configured to perform various hydraulic control functions under the control of an electronic control device, for instance, and which includes a hydraulic circuit (hydraulic control circuit) configured to generate various hydraulic pressures according to commands received from the electronic control device, for example.

Embodiments of this invention will be described in detail by reference to the drawings.

First Embodiment

Figure 1:
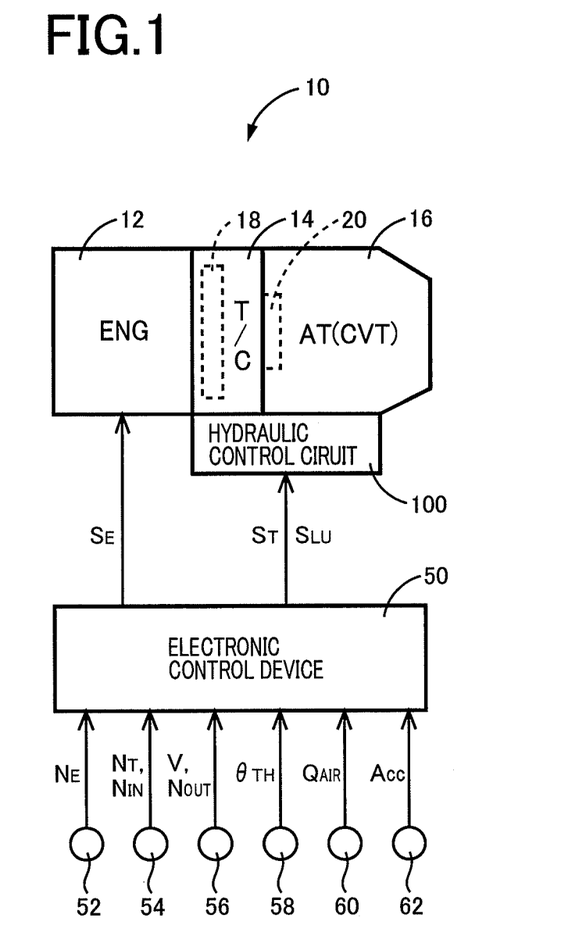
FIG. 1 is a schematic view for explaining an arrangement of a vehicle to which the present invention is applicable.

FIG. 1 is the schematic view for explaining an arrangement of a vehicle 10 to which the present invention is applicable. As shown in FIG. 1, a drive force generated by a vehicle drive power source in the form of an engine 12 is transmitted to drive wheels not shown, successively through a fluid-operated power transmitting device in the form of a torque converter 14, a vehicular automatic transmission 16, a speed reducing gear device not shown, and a differential gear device not shown.

Figure 2:
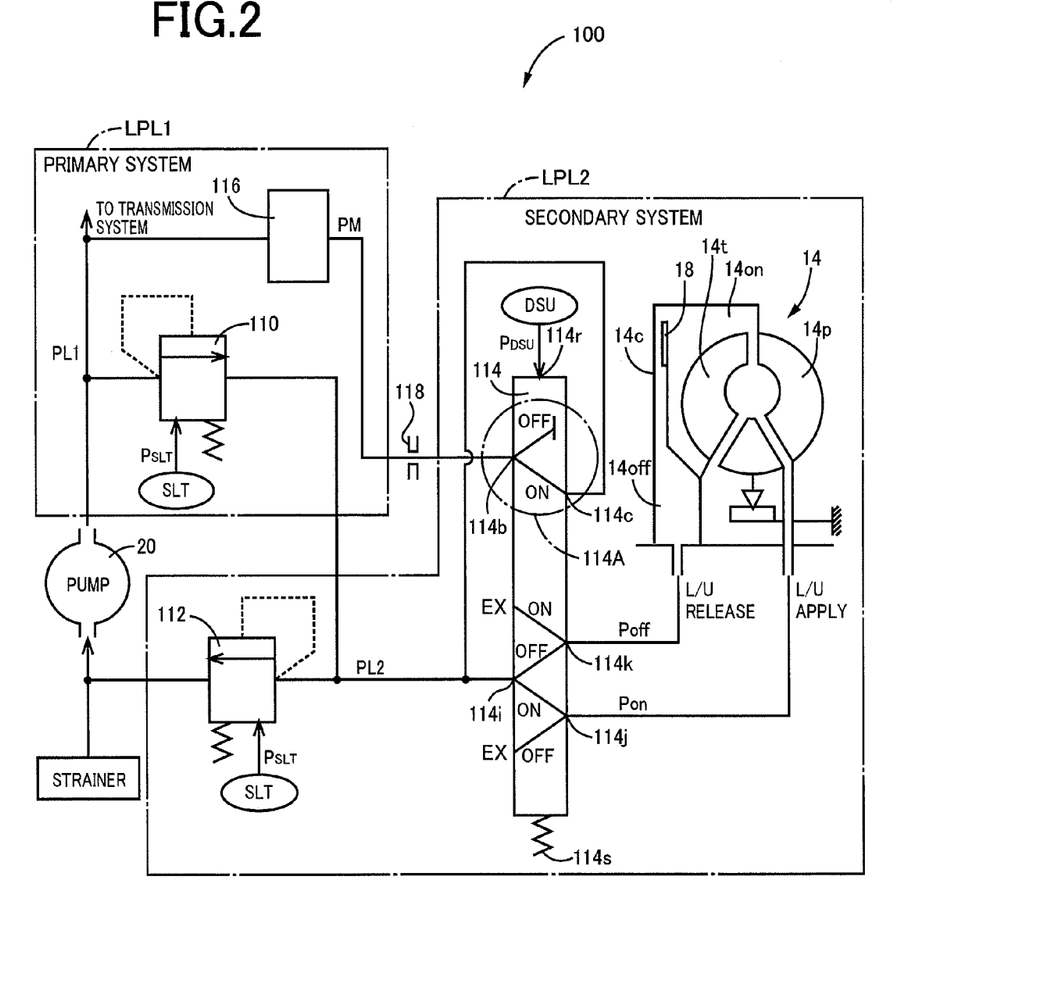
FIG. 2 is a partial hydraulic circuit diagram showing major portions of a hydraulic control circuit, which relate to line pressure controls, and controls of engaging and releasing actions of a lock-up clutch.

The torque converter 14 is provided with a pump impeller 14p connected to a crankshaft of the engine 12, and a turbine impeller 14t connected directly or indirectly to the vehicular automatic transmission 16 through an output member of the torque converter 14 in the form of a turbine shaft, and is constructed to transmit a rotary motion through a working fluid (as shown in FIG. 2). Between the pump impeller 14p and the turbine impeller 14t, there is interposed a lock-up clutch 18 configured to directly connect therebetween, namely, between an input rotational member and the output rotational member of the torque converter 14. To the pump impeller 14p, there is connected a mechanical oil pump 20 operated by the engine 12 to generate a pressure of a working oil which is used to control a shifting operation of the vehicular automatic transmission 16 and the operating state of the lock-up clutch 18 and which is supplied as a lubricant to various lubricating points.

The lock-up clutch 18 is a hydraulically operated friction clutch (shown in FIG. 2) which is brought into a frictional engagement with a front cover 14c, under a control of a hydraulic control apparatus in the form of a hydraulic control circuit 100 which is configured to control a pressure difference $\Delta P$ (=Pon−Poff) between a pressure Pon within an engaging oil chamber 14on and a pressure Poff within a releasing oil chamber 14off, as well known in the art. The torque converter 14 has two major operating states consisting of a so-called "lock-up off state" (released state) in which the lock-up clutch 18 is placed in its released state with a negative value of the pressure difference $\Delta P$, and a so-called "lock-up on" state (engaged state or locked state) in which the lock-up clutch 18 is placed in its engaged state with a positive value of the pressure difference $\Delta P$. When the lock-up clutch 18 is placed in the engaged state, the pump impeller 14p and the turbine impeller 14t are rotated as a unit, so that the drive force of the engine 12 is transmitted directly to the vehicular automatic transmission 16.

The vehicle 10 is provided with an electronic control device 50 for controlling the hydraulic control device for the vehicular automatic transmission 16, and other devices. The electronic control device 50 includes a so-called microcomputer provided with a CPU, a RAM, a ROM and an input-output interface. The CPU performs signal processing operations according to programs stores in the ROM while utilizing a temporary data storage function of the RAM, for implementing various controls of the vehicle 10. For instance, the electronic control device 50 implements an output control of the engine 12, a shifting control of the vehicular automatic transmission 16, and engaging and releasing controls of the lock-up clutch 18. The electronic control device 50 may include mutually independent sections such as an engine control section, and a hydraulic control section for the vehicular automatic transmission 16 and the lock-up clutch 18.

The electronic control device 50 is configured to receive signals such as: an output signal of an engine speed sensor 52 indicative of an operating speed $N_E$ of the engine 12 (engine speed $N_E$); an output signal of an input shaft speed sensor 54 indicative of an input speed (input shaft speed) $N_{IN}$ of the vehicular automatic transmission 16 which corresponds to a turbine speed $N_T$; an output signal of an output shaft speed sensor 56 indicative of an output speed (output shaft speed) $N_{OUT}$ of the vehicular automatic transmission 16 which corresponds to a vehicle running speed V; an output signal of a throttle sensor 58 indicative of an opening angle $\theta_{TH}$ of an electronic throttle valve; an output signal of an intake air quantity sensor 60 indicative of an intake air quantity $Q_{AIR}$ of the engine 12; and an output signal of an accelerator opening angle sensor 62 indicative of a vehicle acceleration value required by a vehicle operator, in the form of an operating amount Acc of an accelerator pedal.

The electronic control device 50 is also configured to generate signals such as: engine output control command signals $S_E$ for controlling an output of the engine 12; hydraulic pressure control command signals $S_T$ for controlling the hydraulic pressure relating to the shifting operation of the vehicular automatic transmission 16; and hydraulic pressure control command signals $S_{LU}$ for controlling the hydraulic pressure relating to the operation of the lock-up clutch 18. Described more specifically, the above-indicated engine output control command signals $S_E$ include a drive signal to be applied to a throttle actuator for controlling the angle of opening of the electronic throttle valve, according to the accelerator pedal operation amount Acc, an fuel injection signal for controlling an amount of injection of a fuel from a fuel injecting device, and an ignition timing signal for controlling the timing of ignition of the engine 12 by an igniting device. The above-indicated hydraulic pressure control command signals $S_T$, which are applied to the hydraulic control circuit 100, include a shifting command signal (a hydraulic pressure command signal, a hydraulic pressure command value, or a drive signal) to drive a solenoid valve SL not shown provided within the hydraulic control circuit 100, for shifting the vehicular automatic transmission 16, and a hydraulic pressure command signal to be applied to a linear solenoid valve SLT to regulate the pressure of the working oil to a first line pressure PL1. The above-indicated hydraulic pressure control command signals $S_{LU}$, which are applied to the hydraulic control circuit 100, include a lock-up control command signal for driving a switching solenoid valve DSU for switching a spool position of a lock-up relay valve 114 provided in the hydraulic control circuit 100.

FIG. 2 is the partial hydraulic circuit diagram showing major portions of the hydraulic control circuit 100, which relate to line pressure controls, and controls of engaging and releasing actions of the lock-up clutch 18. As shown in FIG. 2, the hydraulic control circuit 100 is provided with: a first pressure regulating valve in the form of a primary regulator valve 110 of a pressure-relief type; a second pressure regulating valve in the form of a secondary regulator valve 112 of a pressure-relief type; a lock-up switching valve in the form of a lock-up relay valve 114; a modulator valve 116; an orifice 118; the linear solenoid valve SLT; and the switching solenoid valve DSU.

The primary regulator valve 110 is configured to regulate the pressure of the working oil delivered from (generated by) the oil pump 20, to the first line pressure PL1 according to a load acting on the engine, on the basis of a pilot pressure $P_{SLT}$ which is an output hydraulic pressure of the linear solenoid valve SLT, for example. The secondary regulator valve 112 is configured to regulate the first line pressure PL1 of the working oil discharged from the primary regulator valve 110, to a second line pressure PL2, on the basis of the pilot pressure $P_{SLT}$. The lock-up relay valve 114 is configured to switch the lock-up clutch 18 between its lock-up on (engaged) state and its lock-up off (released) state, by selecting respective passages of supply of the working oil of the second line pressure PL2 to the torque converter 14, on the basis of a pilot pressure $P_{DSU}$, which is an output hydraulic pressure of the switching solenoid valve DSU. The modulator valve 116 is configured to regulate the first line pressure PL1 to a predetermined constant modulator pressure PM. This modulator pressure PM is used to generate the pilot pressures $P_{SLT}$ and $P_{DSU}$, which are controlled by the electronic control device 50, for instance.

In the hydraulic control circuit 100 arranged as described above, a third hydraulic pressure in the form of the modulator pressure PM obtained on the basis of the first line pressure PL1 is applied to the lock-up clutch 18 via an orifice 118 and the lock-up relay valve 114, in addition to the second line pressure PL2. Namely, the hydraulic control circuit 100 is configured such that the working oil is supplied from a primary system LPL1 using the working oil of the first line pressure PL1, to a secondary system LPL2 using the working oil of the second line pressure PL2, via the orifice 118. Accordingly, it is possible to avoid a problem that an increase of the amount of flow of the working oil into the primary system may cause a decrease of the amount of the working oil discharged from the primary regulator valve 110, and an insufficient amount of flow of the working oil into the secondary system LPL2, which leads to a failure to hold the lock-up clutch 18 in the lock-up on state. Namely, it is possible to permit the lock-up clutch 18 in the lock-up on state. Where the vehicular automatic transmission 16 is a known belt-type continuously variable transmission, in particular, the amount of flow of the working oil within the primary system LPL1 is increased for performing a shifting action of the vehicular automatic transmission 16 while assuring a sufficiently high tension of its power transmitting belt, upon an operation of the accelerator pedal for an abrupt acceleration of the vehicle (with an abrupt shift-down action) in the lock-up on state of the lock-up clutch 18, resulting in an insufficient amount of flow of the working oil into the secondary system LPL2, giving rise to a risk of a failure to hold the lock-up clutch 18 in the lock-up on state due to an increase of the engine torque (an increase of an input torque of the lock-up clutch 18). In addition, upon deceleration of the vehicle, the vehicular automatic transmission 16 may be shifted down while the lock-up clutch 18 is held in the lock-up on state to maintain a lowest engine speed without cancellation of a fuel cut control, causing an increase of the amount of flow of the working oil within the primary system LPL1, and an insufficient amount of flow of the working oil into the secondary system LPL2, also giving rise to a failure to hold the lock-up clutch 18 in the lock-up on state. In these respects, the above-described configuration of the hydraulic control circuit 100 is particularly effective to permit the lock-up clutch 18 to be held in the lock-up on state. It is noted that the modulator pressure PM should be set to be higher than the maximum value of the second line pressure PL2, for example, to permit the modulator pressure PM to be applied to the secondary system LPL2.

By the way, where the modulator pressure PM is applied to the lock-up clutch 18 via the orifice 118 also when the lock-up clutch 18 is brought to its lock-up off state, the amount of flow of the working oil is excessively large when the lock-up clutch 18 is brought to the lock-up off state, so that it may be necessary to use the oil pump 20 of an increased size.

In view of the above-indicated potential necessity, the hydraulic control circuit 100 according to the present embodiment includes a supply passage connecting/disconnecting valve 114A which is operated, in synchronization with a switching operation of the lock-up relay valve 114, to apply the modulator pressure PM to the lock-up clutch 18 via the orifice 118, for placing the lock-up clutch 18 its lock-up on state, and to inhibit the application of the modulator pressure PM to the lock-up clutch 18, for placing the lock-up clutch 18 in its lock-up off state. In the present embodiment, the supply passage connecting/disconnecting valve 114A is formed as an integral part of the lock-up relay valve 114. That is, the lock-up relay valve 114 provided in the present embodiment has a function of the supply passage connecting/disconnecting valve 114A.

Described in detail, the lock-up relay valve 114 is provided with a spool (not shown) axially movable between an ON position and an OFF position, a spring 114s biasing the spool toward the OFF position, and an oil chamber 114r which receives the pilot pressure $P_{DSU}$ to apply a thrust force to the spool in the direction toward the ON position. In the ON position of the spool, the working oil (having the second line pressure PL2 or the modulator pressure PM received via the orifice 118 when the lock-up clutch 18 is brought to the lock-up on state, or the second line pressure PL2 when the lock-up clutch 18 is brought to the lock-up off state) can be supplied to an engaging oil chamber 14on through an input port 114i and an input-output port 114j, to apply a lock-up engaging hydraulic pressure Pon to the engaging oil chamber 14on, and a releasing oil chamber 14off is held in communication with a discharge port EX through an input-output port 114k, while the modulator pressure PM received via the orifice 118 is applied to the input port 114i through an input port 114b and an output port 114c. In the OFF position, the working oil can be supplied to a releasing oil chamber 14off through the input port 114i and the input-output port 114k, to apply a lock-up releasing hydraulic pressure Poff to the releasing oil chamber 14off, and the engaging oil chamber 14on is held in communication with the discharge port EX through the input-output port 114j, while the input port 114b inhibits the application of the modulator pressure PM via the orifice 118 to the input port 114i.

In the lock-up relay valve 114 configured as described above, the spool is moved to the ON position against a biasing force of the spring 114s, by the thrust force corresponding to the pilot pressure $P_{DSU}$ applied to the oil chamber 114r when the switching solenoid valve DSU is turned on (energized). Accordingly, the second line pressure PL2, and the modulator pressure PM applied via the orifice 118 to the input port 114*i* through the input port 114*b* and the output port 114*c*, are applied as the lock-up engaging hydraulic pressure Pon to the engaging oil chamber 14on through the input port 114*i* and the input-output port 114*j*, while the working oil is discharged from the releasing oil chamber 14off through the input-output port 114*k* and the discharge port EX. Namely, the working oil is supplied into the engaging oil chamber 14on and discharged from the releasing oil chamber 14off. As a result, the lock-up clutch 18 is placed in the engaged state (in the lock-up on state). When the lock-up clutch 18 is thus placed in the lock-up on state, the modulator pressure PM received via the orifice 118 is applied to the lock-up clutch 18, to permit the lock-up clutch 18 to be held in the lock-up on state.

On the other hand, the spool is moved to the OFF position by the biasing force of the spring 114*s*, in the absence of the pilot pressure $P_{DSU}$ when the switching solenoid valve DSU is turned off (de-energized). Accordingly, the second line pressure PL2 is applied as the lock-up releasing hydraulic pressure Poff to the releasing oil chamber 14off through the input port 114*i* and the input-output port 114*k*, while the working oil is discharged from the engaging oil chamber 14on through the input-output port 114*j* and the discharge port EX. Namely, the working oil is supplied into the releasing oil chamber 14off and discharged from the engaging oil chamber 14on. As a result, the lock-up clutch 18 is placed in the released state (in the lock-up off state). In the OFF position of the spool, the input port 114*b* inhibits the application of the modulator pressure PM via the orifice 118 to the input port 114*i*, to permit the lock-up clutch 18 to be held in the lock-up state. When the lock-up clutch 18 is placed in the lock-up off state, the application of the modulator pressure PM via the orifice 118 is inhibited, so that the total amount of flow and consumption of the working oil is reduced.

Figure 3:
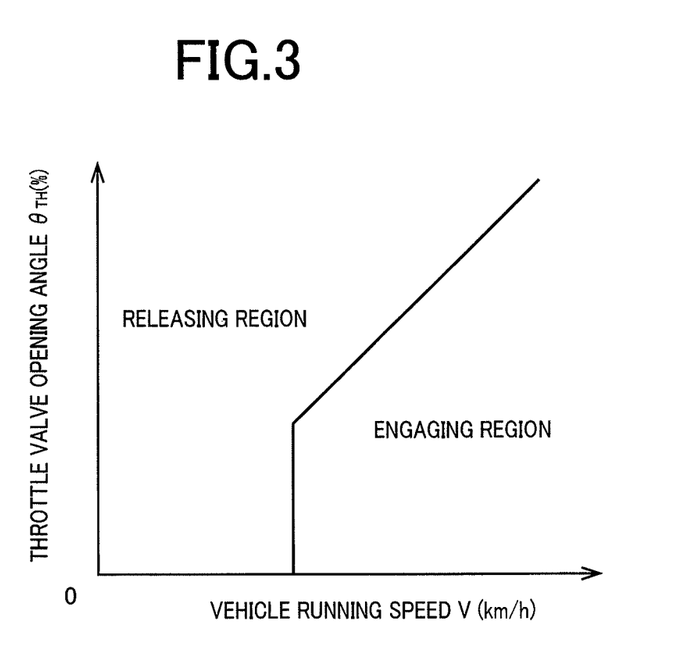
FIG. 3 is a view indicating a lock-up control map used to control the lock-up clutch.

As described above, the lock-up clutch 18 is placed in the engaged state when the pilot pressure $P_{DSU}$ is generated, and placed in the released state when the pilot pressure $P_{DSU}$ is not generated. The electronic control device 50 applies the above-described lock-up control command signal for switching the operating state of the lock-up clutch 18 to the hydraulic control circuit 100, according to a result of a determination as to whether a point defined by the actual throttle valve opening angle $\theta_{TH}$ and vehicle running speed V lies in a releasing region or an engaging region in a two-dimensional coordinate system, and according to a predetermined and stored relation (map, lock-up control diagram) between the throttle valve opening angle $\theta_{TH}$ and the vehicle running speed V, which relation is indicated in FIG. 3 by way of example. The hydraulic control circuit 100 controls the switching solenoid valve DSU to place the lock-up clutch 18 in the operating state selected according to the lock-up control command signal.

The present embodiment described above includes the supply passage connecting/disconnecting valve 114A which is operated, in synchronization with the switching operation of the lock-up relay valve 114, to apply the modulator pressure PM via the orifice 118 to the lock-up clutch 18, when the lock-up clutch 18 is placed in the lock-up on state, and to inhibit the application of the modulator pressure PM to the lock-up clutch 18, when the lock-up clutch 18 is placed in its lock-up off state. Accordingly, the modulator pressure PM received via the orifice 118 is not applied to the lock-up clutch 18 when the lock-up clutch 18 is placed in the lock-up off state, so that the total amount of flow and consumption of the working oil is reduced, making it possible to design the oil pump 20 with a reduced delivery capacity, thereby permitting an improvement of fuel economy of the vehicle.

The present embodiment is configured such that the working oil of the predetermined constant hydraulic pressure (modulator pressure PM) obtained by the modulator valve 116 on the basis of the first line pressure PL1 is discharged toward the supply passage connecting/disconnecting valve 114A via the orifice 118. Accordingly, the working oil is adequately supplied from the primary system LPL1 via the orifice 118 to the secondary system LPL2, to avoid an insufficient amount of flow of the working oil into the secondary system LPL2 and a consequent failure to hold the lock-up clutch in the lock-up on state, that is, to permit the lock-up clutch in the lock-up on state.

The present embodiment is further configured such that the supply passage connecting/disconnecting valve 114A is formed as an integral part of the lock-up relay valve 114. This configuration has an advantage in terms of saving of required space and cost of manufacture of the supply passage connecting/disconnecting valve 114A, and simplicity of a passage for application of the pilot pressure $P_{DSU}$ for the switching operation of the lock-up relay valve as compared to a case where the supply passage connecting/disconnecting valve 114A and the lock-up relay valve 114 are designed separately.

Other embodiments of this invention will be described. The same reference signs will be used to identify the mutually corresponding elements of the different embodiments, which will not be described.

Second Embodiment

In the preceding embodiment, the modulator pressure PM is applied via the orifice 118 to the lock-up clutch 18 to place the lock-up clutch 18 in the lock-up on state, and the application of the modulator pressure PM to the lock-up clutch 18 is inhibited to place the lock-up clutch 18 in its lock-up off state, so that the modulator pressure PM received via the orifice 118 is kept applied to the lock-up clutch 18 to place the lockup clutch 18 in the lock-up on state, irrespective of whether the amount of flow of the working oil into the secondary system LPL2 is insufficient or not. However, it is possible to consider that the modulator pressure PM received via the orifice 118 need not be applied to the lock-up clutch 18 if the amount of flow of the working oil into the secondary system LPL2 is sufficient. In view of this consideration, the present embodiment is configured to apply the modulator pressure PM via the orifice 118 to the lock-up clutch 18 for placing the lock-up clutch 18 in the lock-up on state, only when the amount of flow of the working oil into the secondary system LPL2 is insufficient, and the second line pressure PL2 is lower than a required lock-up pressure value $P_{LU}$. This configuration permits the application of the required lock-up pressure $P_{LU}$ to the lock-up clutch 18, while further reducing the amount of consumption of the working oil.

Figure 4:
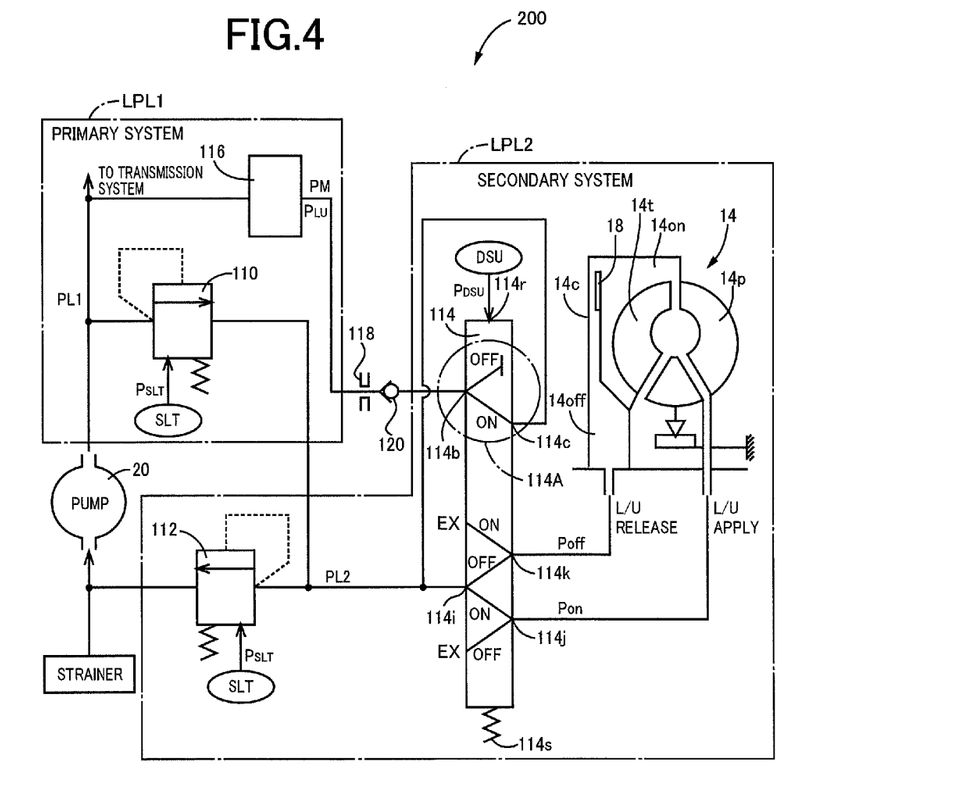
FIG. 4 is a partial hydraulic circuit diagram showing major portions of a hydraulic control circuit according to another embodiment of the invention corresponding to the hydraulic control circuit of FIG. 2, which major portions relate to line pressure controls, and controls of engaging and releasing actions of a lock-up clutch.

FIG. 4 is the partial hydraulic circuit diagram showing major portions of a hydraulic control circuit 200 according to the present embodiment of the invention corresponding to the hydraulic control circuit 100 of FIG. 2, which major portions relate to line pressure controls, and controls of the engaging and releasing actions of the lock-up clutch 18. The modulator valve 116 shown in FIG. 4 is set up to generate the modulator pressure PM to be the required lock-up pressure value $P_{LU}$ which permits the lock-up clutch 18 to be held in the lock-up on state (to be stably brought into the lock-up on state) and which is obtained by experimentation (or by calculation), for example. The hydraulic control circuit 200 further includes a check valve 120 which is disposed upstream of the supply passage connecting/disconnecting valve 114A and which permits a flow of the working oil of the required lock-up pressure $P_{LU}$ via the orifice 118 in the downstream direction, only when the second line pressure PL2 is lower than the required lock-up pressure $P_{LU}$.

In the hydraulic control circuit 200 constructed as described above, the application of the modulator pressure PM via the orifice 118 to the lock-up clutch 18 is inhibited in the absence of the pilot pressure $P_{DSU}$ with the switching solenoid valve DSU being placed in the off (de-energized) state to place the lock-up clutch 18 in the lock-up off state, so that the total amount of flow and consumption of the working oil is reduced. If the amount of flow of the working oil into the secondary system LPL2 is sufficient so that the second line pressure PL2 is equal to or higher than the required lock-up pressure value $P_{LU}$, when the switching solenoid valve DSU is placed in the on (energized state) state to apply the pilot pressure $P_{DSU}$ to the oil chamber 114r for placing the lock-up clutch 18 in the lock-up on state, on the other hand, the flow of the working oil of the modulator pressure PM via the orifice 118 into the supply passage connecting/disconnecting valve 114A is inhibited by the check valve 120, whereby the amount of consumption of the working oil is further reduced. If the amount of flow of the working oil into the secondary system LPL2 is insufficient so that the second line pressure PL2 is lower than the required lock-up pressure value $P_{LU}$, when the lock-up clutch 18 is brought into the lock-up on state, however, the check valve 120 is opened to permit the flow of the working oil of the modulator pressure PM via the orifice 118 to the supply passage connecting/disconnecting valve 114A, permitting the lock-up clutch 18 to be held in the lock-up on state with the required lock-up pressure $P_{LU}$.

As described above, the present embodiment has the advantages described above with respect to the preceding embodiment. In addition, the present embodiment is configured such that the working oil of the modulator pressure PM is regulated to the required lock-up pressure value $P_{LU}$ predetermined to permit the described lock-up clutch 18 to be held in the lock-up on state, and such that the hydraulic control circuit further includes the check valve 120 which is disposed upstream of the supply passage connecting/disconnecting valve 114A and which permits a flow of the working oil of the required lock-up pressure $P_{LU}$ from the orifice 118 in the downstream direction, only when the second line pressure PL2 is lower than the required lock-up pressure $P_{LU}$. Thus, the supply of the working oil of the required lock-up pressure $P_{LU}$ via the orifice 118 to the lock-up clutch 18 is inhibited even when the lock-up clutch 18 is brought to its lock-up on state, unless that the amount of the working oil discharged from the primary regulator valve 110 is insufficient so that the second line pressure PL2 is lower than the required lock-up pressure $P_{LU}$. Accordingly, the required lock-up pressure $P_{LU}$ is maintained, and the amount of flow and consumption of the working oil is further reduced, making it possible to design the oil pump 20 with a reduced delivery capacity, thereby permitting a further improvement of the fuel economy of the vehicle.

While the embodiments of the present invention have been described above in detail by reference to the drawings, it is to be understood that the embodiments may be combined together, and that the invention may be otherwise embodied.

Figure 5:
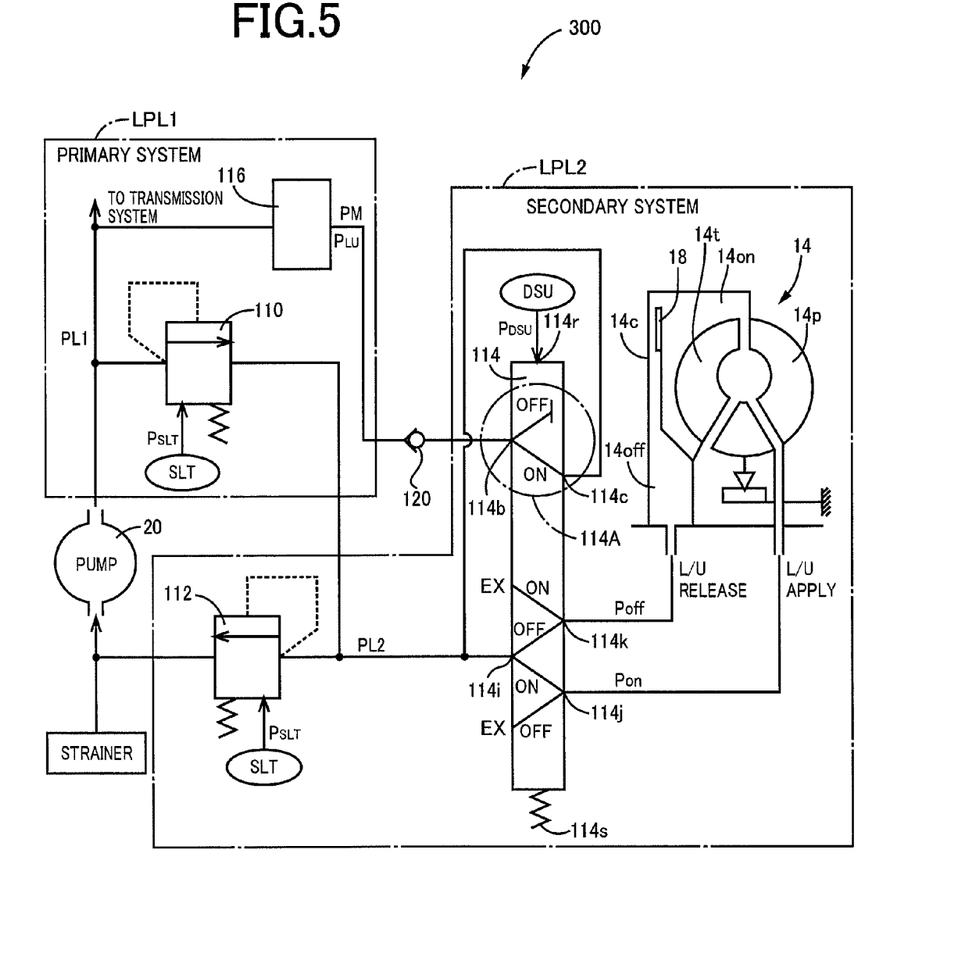
FIG. 5 is a partial hydraulic circuit diagram showing major portions of a hydraulic control circuit according to a further embodiment of the invention corresponding to the hydraulic control circuit of FIG. 4, which major portions relate to line pressure controls, and controls of engaging and releasing actions of a lock-up clutch.

For example, the orifice 118 through which the modulator pressure PM is applied to the secondary system LPL2 in the illustrated embodiments is not essential. FIG. 5 is the partial hydraulic circuit diagram showing major portions of a hydraulic control circuit 300 according to a further embodiment of the invention corresponding to the hydraulic control circuit 200 of FIG. 4, which major portions relate to line pressure controls, and controls of the engaging and releasing actions of the lock-up clutch 18. The hydraulic control circuit 300 shown in FIG. 5 is identical with the hydraulic control circuit 200 of FIG. 4, except for the elimination of the orifice 118. Further, the cross sectional area of the supply passage through which the working oil of the modulator pressure PM flows, or the geometry of the input port 114b may be designed to provide a flow restricting function as performed by the orifice 118. Where the orifice 118 is provided, the third hydraulic pressure obtained on the basis of the first line pressure PL1 is the modulator pressure PM of the working fluid which has flown through the orifice 118, that is, the hydraulic pressure on the downstream side of the orifice 118. Where the orifice 118 is not provided, the third hydraulic pressure obtained on the basis of the first line pressure PL1 is equal to the modulator pressure PM.

Figure 6:
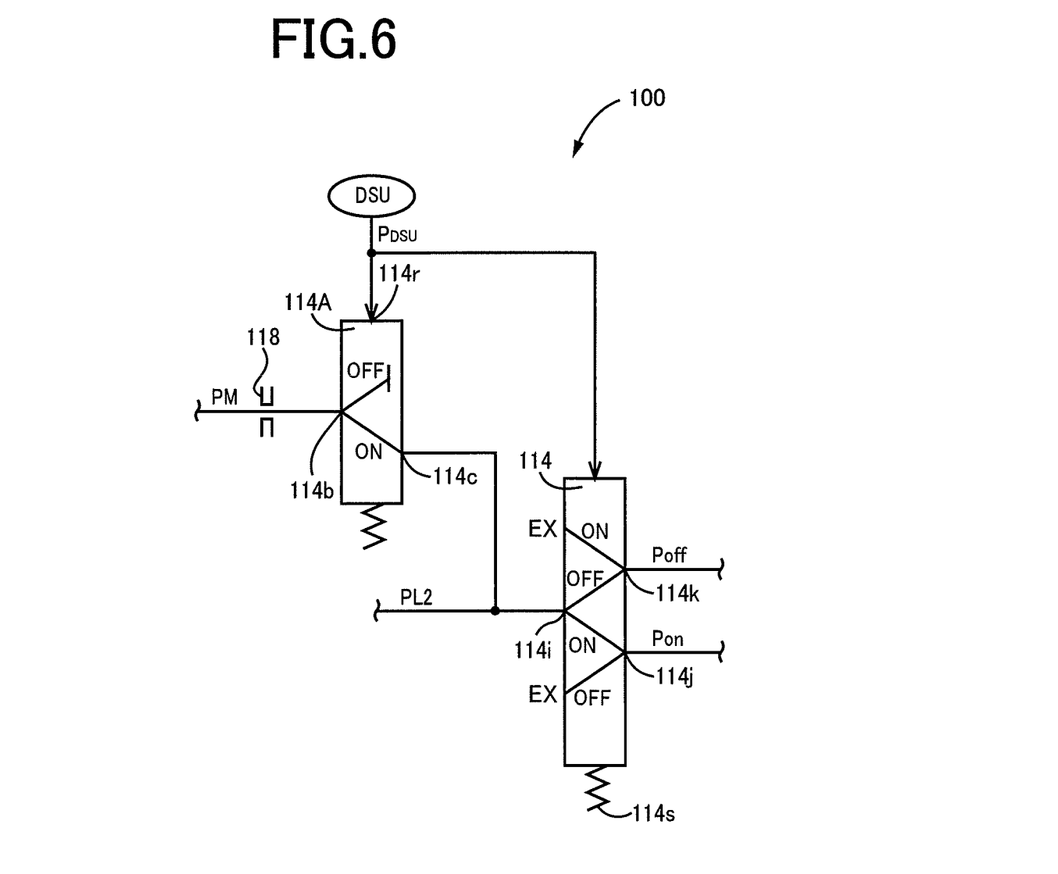
FIG. 6 is a view showing an example of a hydraulic control circuit in which a supply passage connecting/disconnecting valve and a lock-up relay valve are formed separately from each other.

In the illustrated embodiments, the supply passage connecting/disconnecting valve 114A is formed as an integral part of the lock-up relay valve 114. However, the integral formation of the supply passage connecting/disconnecting valve 114A is not essential, provided that the valve 114A is operated in synchronization with the switching operation of the lock-up relay valve 114. For instance, the supply passage connecting/disconnecting valve 114A shown in FIG. 6 is formed separately from the lock-up relay valve 114, and is operated also on the basis of the pilot pressure $P_{DSU}$. It is needless to say that while the configurations of the various ports and the manner of operations of the supply passage connecting/disconnecting valve 114A and the lock-up relay valve 114, which have been described for illustrative purpose only, may be modified as long as the valves 114A and 114 can perform their intended functions.

Although the secondary regulator valve 112 of the pressure-relief type is provided as the second pressure regulating valve in the illustrated embodiment, the second pressure regulating valve may be of a pressure reducing type.

While the torque converter 14 provided with the lock-up clutch 18 is used as the fluid-operated power transmitting device, the torque converter 14 may be replaced by any other type of fluid-operated power transmitting device such as a fluid coupling which does not have a torque boosting function.

Although the illustrated embodiments have been described above, it is to be understood that the present invention may be embodied with various other changes and improvements, which may occur to those skilled in the art.

NOMENCLATURE OF REFERENCE SIGNS

14: Torque converter (Fluid-operated power transmitting device)
16: Vehicular automatic transmission
18: Lock-up clutch
20: Oil pump
100, 200, 300: Hydraulic control circuit (Hydraulic control apparatus)
110: Primary regulator valve (First pressure regulating valve of pressure-relief type)
112: Secondary regulator valve (Second pressure regulating valve)
114: Lock-up relay valve (Lock-up switching valve)
114A: Supply passage connecting/disconnecting valve
116: Modulator valve
118: Orifice
120: Check valve

The invention claimed is:

1. A hydraulic control apparatus for a vehicular automatic transmission, which is provided with a first pressure regulating valve of a pressure-relief type for regulating a pressure of a working oil delivered from an oil pump, to a first line pressure, a second pressure regulating valve for regulating said first line pressure of the working oil discharged from said first pressure regulating valve, to a second line pressure, and a lock-up switching valve for switching a lock up clutch provided in a fluid-operated power transmitting device, between its lock-up on state and its lock-up off state, by selecting respective passages of supply of the working oil of said second line pressure to said fluid-operated power transmitting device, said hydraulic control apparatus being configured such that the working oil of a third hydraulic pressure obtained on the basis of said first line pressure is supplied to said lock-up clutch with said lock-up switching valve, in addition to the working oil of said second line pressure, said hydraulic control apparatus comprising:

a supply passage connecting/disconnecting valve which is operated, in synchronization with a switching operation of said lock-up switching valve, to supply the working oil of said third hydraulic pressure to said lock-up clutch, when the lock-up clutch is placed in the lock-up on state, and to inhibit the supply of the working oil of said third hydraulic pressure to said lock-up clutch, when the lock-up clutch is placed in its lock-up off state.

2. The hydraulic control apparatus according to claim 1, wherein the working oil of said third hydraulic pressure is a working oil a pressure of which has regulated to a required lock-up pressure predetermined to permit said lock-up clutch to be held in the lock-up on state, and further comprising:

a check valve which is disposed upstream of said supply passage connecting/disconnecting valve and which permits a flow of the working oil of said required lock-up pressure in a downstream direction, only when said second line pressure is lower than the required lock-up pressure.

3. The hydraulic control apparatus according to claim 1, wherein the working oil of said third hydraulic pressure is a working oil a pressure of which has been regulated by a modulator valve to a predetermined constant pressure value on the basis of said first line pressure and which has been discharged toward said supply passage connecting/disconnecting valve via an orifice.

4. The hydraulic control apparatus according to claim 1, wherein said supply passage connecting/disconnecting valve is formed as an integral part of said lock-up switching valve.

* * * * *